United States Patent
Rios

(10) Patent No.: US 10,799,792 B2
(45) Date of Patent: Oct. 13, 2020

(54) COORDINATING MULTIPLE VIRTUAL ENVIRONMENTS

(71) Applicant: AT&T Intellectual Property I, L.P., Atlanta, GA (US)

(72) Inventor: Roque Rios, Middletown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 366 days.

(21) Appl. No.: 14/807,568

(22) Filed: Jul. 23, 2015

(65) Prior Publication Data
US 2017/0021273 A1  Jan. 26, 2017

(51) Int. Cl.
*A63F 13/332* (2014.01)
*G06F 3/0481* (2013.01)
(Continued)

(52) U.S. Cl.
CPC .......... *A63F 13/332* (2014.09); *A63F 13/216* (2014.09); *A63F 13/69* (2014.09);
(Continued)

(58) Field of Classification Search
CPC . G06T 19/006; G06T 2219/024; G06F 3/011; G06F 3/04815; G06F 3/04842; A63F 2300/8082; A63F 2300/5573; A63F 13/216; A63F 13/332; A63F 13/87; A63F 13/69; A63F 13/795; A63F 13/822; H04L 67/38; G06K 9/00671; G06G 3/003
See application file for complete search history.

(56) References Cited

U.S. PATENT DOCUMENTS 6,421,047 B1  7/2002 De
6,767,287 B1  7/2004 Mcquaid et al.
(Continued)

FOREIGN PATENT DOCUMENTS

WO  WO 2013171731  11/2013

OTHER PUBLICATIONS

"Multi-User Virtual Environments for Education," CITEd Research Center, cited.org, Accessed: Jun. 2015. Discloses reviews of some educational applications of multi-user virtual environments.
(Continued)

*Primary Examiner* — Andrew L Tank

(57) ABSTRACT

Examples for managing the participation of users in multiple virtual environments are described. An example method includes a processor receiving from a first user device a virtual object that is created by a user and at least one trigger condition for presenting the virtual object, obtaining a physical location of the first user device, and receiving a selection of a first virtual environment for the virtual object from among a plurality of virtual environments associated with the first user device. The method may further include the processor associating the virtual object with the physical location and with the first virtual environment that is selected, and presenting the virtual object to a second user device associated with the first virtual environment when the at least one trigger condition is encountered, where the at least one trigger condition includes a condition that the second user device is proximate to the physical location.

20 Claims, 7 Drawing Sheets

(51) Int. Cl.
*G06F 3/0484* (2013.01)
*G06T 19/00* (2011.01)
*A63F 13/87* (2014.01)
*A63F 13/216* (2014.01)
*A63F 13/69* (2014.01)
*A63F 13/795* (2014.01)
*A63F 13/822* (2014.01)

(52) U.S. Cl.
CPC .......... *A63F 13/795* (2014.09); *A63F 13/822* (2014.09); *A63F 13/87* (2014.09); *G06F 3/04815* (2013.01); *G06F 3/04842* (2013.01); *G06T 19/006* (2013.01)

(56) References Cited

U.S. PATENT DOCUMENTS

| | | | |
|---|---|---|---|
| 7,693,702 B1 | 4/2010 | Kerner et al. | |
| 7,796,155 B1 | 9/2010 | Neely et al. | |
| 7,804,507 B2 | 9/2010 | Yang et al. | |
| 7,811,200 B2 | 10/2010 | Chiang | |
| 7,853,296 B2 | 12/2010 | Yu et al. | |
| 7,966,024 B2 * | 6/2011 | Cohen | G06F 17/30041 345/636 |
| 8,167,724 B2 | 5/2012 | Shuster | |
| 8,253,735 B2 | 8/2012 | Shuster | |
| 8,276,071 B2 | 9/2012 | Shuster et al. | |
| 8,681,178 B1 | 3/2014 | Tseng | |
| 8,713,731 B2 | 5/2014 | Hamilton et al. | |
| 8,986,115 B2 * | 3/2015 | Vignocchi | A63F 13/10 463/29 |
| 9,007,473 B1 | 4/2015 | Worley et al. | |
| 9,288,079 B2 * | 3/2016 | Douris | H04L 12/6418 |
| 9,338,589 B2 * | 5/2016 | Loxam | H04N 5/232 |
| 9,349,217 B1 * | 5/2016 | Worley, III | G06T 19/003 |
| 9,384,067 B2 * | 7/2016 | Chen | G06F 9/542 |
| 9,403,087 B2 * | 8/2016 | Riley | A63F 13/12 |
| 9,703,369 B1 * | 7/2017 | Mullen | G06F 3/01 |
| 2002/0090985 A1 * | 7/2002 | Tochner | A63F 13/12 463/1 |
| 2003/0210832 A1 * | 11/2003 | Benton | G06T 19/006 382/284 |
| 2004/0139159 A1 | 7/2004 | Ricciardi et al. | |
| 2009/0054084 A1 * | 2/2009 | Buhrke | H04W 4/02 455/456.3 |
| 2010/0131947 A1 | 5/2010 | Ackley et al. | |
| 2010/0325154 A1 * | 12/2010 | Schloter | G06F 16/907 707/770 |
| 2011/0319148 A1 * | 12/2011 | Kinnebrew | A63F 13/216 463/1 |
| 2012/0122570 A1 | 5/2012 | Bronoff | |
| 2012/0229508 A1 * | 9/2012 | Wigdor | G06F 3/147 345/633 |
| 2012/0249544 A1 | 10/2012 | Maciocci et al. | |
| 2012/0256917 A1 | 10/2012 | Lieberman et al. | |
| 2012/0264510 A1 * | 10/2012 | Wigdor | G06F 3/011 463/31 |
| 2013/0117377 A1 * | 5/2013 | Miller | H04L 67/38 709/205 |
| 2013/0120365 A1 | 5/2013 | Lee et al. | |
| 2013/0222393 A1 * | 8/2013 | Merrell | G06T 11/00 345/441 |
| 2013/0278631 A1 | 10/2013 | Border et al. | |
| 2013/0290876 A1 * | 10/2013 | Anderson | G06T 19/006 715/761 |
| 2013/0296043 A1 * | 11/2013 | Weinshanker | A63F 13/63 463/30 |
| 2013/0342564 A1 * | 12/2013 | Kinnebrew | G09G 3/003 345/619 |
| 2014/0028712 A1 | 1/2014 | Keating et al. | |
| 2014/0063060 A1 | 3/2014 | Maciocci et al. | |
| 2014/0364209 A1 | 12/2014 | Perry | |
| 2014/0368537 A1 * | 12/2014 | Salter | G06T 19/006 345/633 |
| 2014/0375688 A1 * | 12/2014 | Redmann | G06T 19/006 345/633 |
| 2015/0097719 A1 | 4/2015 | Balachandreswaran et al. | |
| 2015/0206349 A1 * | 7/2015 | Rosenthal | H04N 21/41407 345/633 |
| 2016/0133230 A1 * | 5/2016 | Daniels | G06T 19/006 345/633 |
| 2016/0253842 A1 * | 9/2016 | Shapira | G02B 27/017 345/633 |

OTHER PUBLICATIONS

Kasahara, Shunichi, et al. "Second surface: multi-user spatial collaboration system based on augmented reality." SIGGRAPH Asia 2012 Emerging Technologies. ACM, 2012. Discloses "A future system [that] will be based on a cloud service that collects dictionary data and 3D reconstruction data from all its users and provide this data to anyone in the form of a map."

Wagner, Daniel, et al. Towards massively multi-user augmented reality on handheld devices. Springer Berlin Heidelberg, 2005. Discloses "A system architecture for interactive, infrastructure-independent multi-user AR applications running on off-the-shelf handheld devices."

Butcher, Mike, "Layar Launches Stiktu, An AR App to Graffiti the Real World," TC, techcrunch.com, Jun. 12, 2012. With Stiktu "users to add their own drawings, text, images and stickers to magazines, posters and more by simply scanning them with a smartphoneâ€¦Thus anyone can scan the image in the real world and see what someone has done to it."

Ismail, Ajune Wanis, and Mohd Shahrizal Sunar. "Collaborative augmented reality: multi-user interaction in urban simulation." Visual Informatics: Bridging Research and Practice. Springer Berlin Heidelberg, 2009. 382-391. "This paper will give an overview for collaborative AR framework employed in urban simulation and the multi-user interaction on how to share these virtual spaces with other users in collaboration."

Applin, Sally, and Michael D. Fischer. "Toward a Multiuser Social Augmented Reality Experience: Shared pathway experiences via multichannel applications." Consumer Electronics Magazine, IEEE 4.2 (2015): 100-106. Discloses encouragement of development of user experience that "emerges from the aggregate of multiplexed asynchronous or synchronous data pathways of interacting individuals."

Haller, Chris, "Mobile AR Allows Residents to Visualize How Building Plans Will Transform Their Neighborhood," Engaging Cities, engagingcities.com, Aug. 6, 2012. "Augmented reality has the potential to enhance the information developers and planners are required to share with people living and working near proposed developments."

Urbonas, Sarah, "Arc: Bridging the Gap between Community Members and Architects," idea, northeastern.edu, Northeastern University's Venture Accelerator, Feb. 18, 2015. "Arc provides users a model of proposed building projects in real time and space through the camera of an iPad. It also allows users to submit feedback both in-app and online, giving community members a voice they did not have before."

Sueselbeck, Richard, et al. "Adaptive update propagation for low-latency massively multi-user virtual environments." Computer Communications and Networks, 2009. ICCCN 2009. Proceedings of 18th Internatonal Conference on. IEEE, 2009. "Massively Multi-User Virtual Environments (MMVEs) are highly interactive systems. They require the propagation of state updates to users with little delay. In this paper we propose a novel update propagation approachâ€¦ to support MMVEs with massive user numbers."

Gimeno, Jesus, et al. "Multiuser augmented reality system for indoor exhibitions." Human-Computer Interaction—INTERACT 2011. Springer Berlin Heidelberg, 2011. 576-579. Discloses "An augmented reality system for indoor exhibitions is presented . . . with virtual 3D objects which visitors can manipulate."

* cited by examiner

COORDINATING MULTIPLE VIRTUAL ENVIRONMENTS

The present disclosure relates generally to methods and apparatuses for managing the participation of users in virtual environments, or augmented reality environments.

BACKGROUND

Large scale virtual worlds exist, such as massive multiplayer online role playing games, with millions of users experiencing their own individual existences in the same virtual world. Sometimes these individual experiences may overlap in the same virtual world, e.g., two or more users may experience the same aspects within a virtual place of the online virtual world at the same time. However, these individual experiences are limited to the virtual world that is displayed on the monitor or screen of each individual user.

SUMMARY

Examples of the present disclosure disclose methods, computer-readable media and apparatuses for managing the participation of users in multiple virtual environments. In one example, a method includes a processor receiving from a first user device a virtual object that is created by a user and at least one trigger condition for presenting the virtual object. The method may further include the processor obtaining a physical location of the first user device, and receiving a selection of a first virtual environment for the virtual object, where the first virtual environment is selected from among a plurality of virtual environments associated with the first user device. In one example, the method further includes the processor associating the virtual object with the physical location and with the first virtual environment that is selected, and presenting the virtual object to at least a second user device associated with the first virtual environment when the at least one trigger condition is encountered. In one example, the at least one trigger condition includes a condition that the second user device is proximate to the physical location.

In another example, a computer-readable medium stores instructions that, when executed, cause a processor to perform operations that include receiving a selection of priorities between a first virtual environment associated with a user of a user device and a second virtual environment associated with the user, detecting a physical location of the user device, providing the physical location to a server, and receiving virtual objects associated with the physical location. In one example, a first virtual object of the virtual objects is associated with the first virtual environment and a second virtual object of the virtual objects is associated with the second virtual environment. In one example, the operations further include displaying at least the first virtual object based upon the selection of priorities.

BRIEF DESCRIPTION OF THE DRAWINGS

To facilitate understanding, identical reference numerals have been used, where possible, to designate identical elements that are common to the figures.

DETAILED DESCRIPTION

Figure 1:
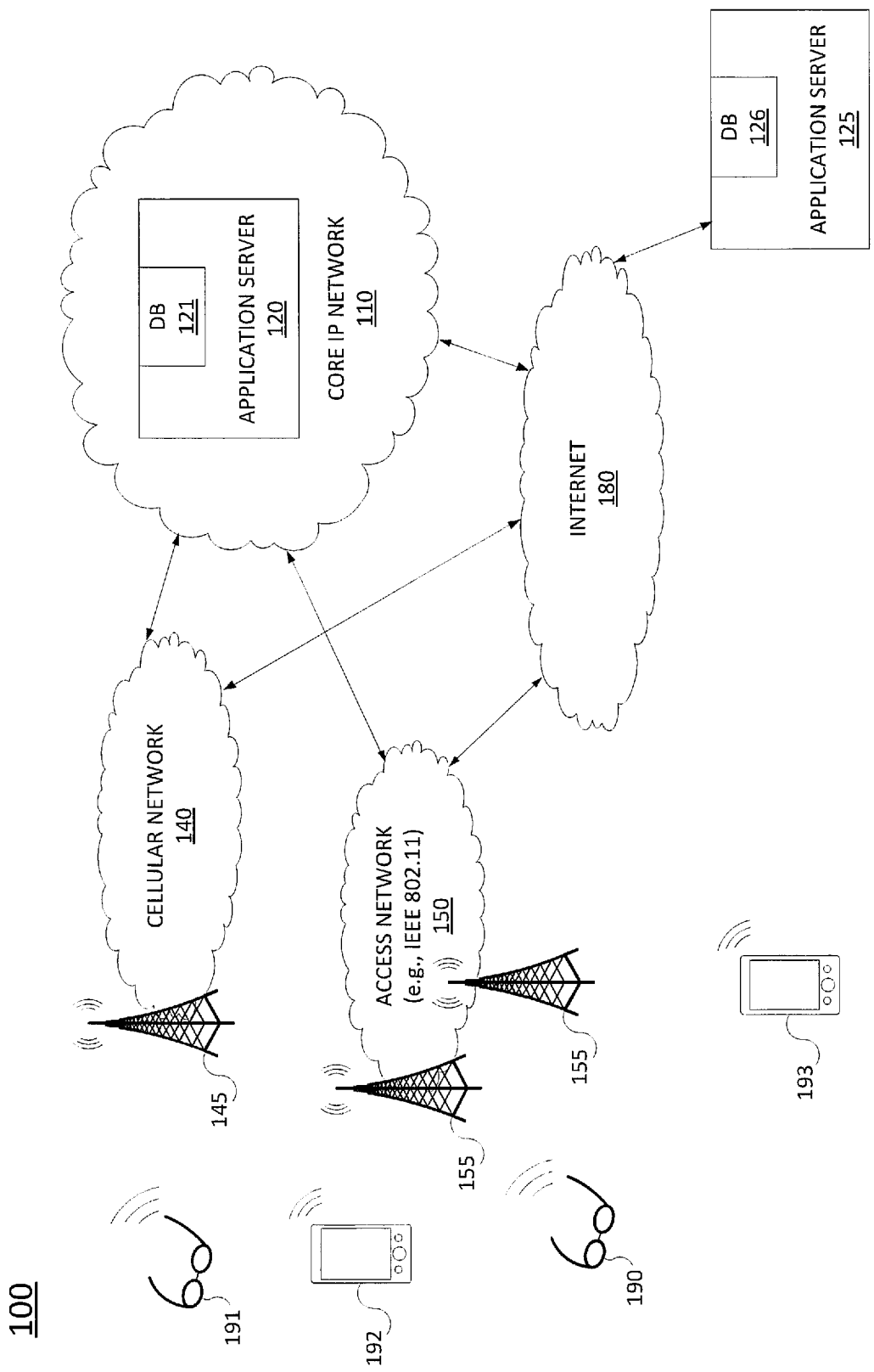
FIG. 1 illustrates an example system related to the present disclosure.

The present disclosure provides for the management and coordination of multiple augmented reality (AR) environments, or "virtual environments," to immerse a community of users into the same, persistent, online, and interactive environment augmented over real-life. As used herein, the term AR environment, broadly, a virtual environment, refers to a set of images or sounds that are generated by AR devices and systems of the present disclosure and that are presented to users as a supplement to images and sounds that are generated outside of the devices and systems of the present disclosure, i.e., in the "real-world." Thus, the terms augmented reality (AR) environment and virtual environment may be used herein to refer to the entire environment experienced by a user, including real-world images and sounds combined with images and sounds of the AR environment/virtual environment. The images and sounds of an AR environment may be referred to as "virtual objects" and may be presented to users via AR devices and systems of the present disclosure. While the real world may include other machine generated images and sounds, e.g., animated billboards, music played over loudspeakers, and so forth, these images and sounds are considered part of the "real-world," in addition to natural sounds and sights such as waves crashing on a beach, the sound of wind through the trees and the corresponding image of waving tree branches, the sights and sounds of wildlife, and so on.

In one example, each user of an AR system of the present disclosure, also referred to herein as an online augmented reality (ONAR) system, is equipped with any type of AR device that is able to determine a position within the real world, that enables a human being to experience "virtual objects" of AR environments, and that is web-connected to handle client-server and cloud interactions. This can include a mobile device or portable computing device, such as a cellular telephone or smart phone, a tablet computing device, networked eyeglasses and headsets with image and/or sound projection capabilities, and so forth. The term "virtual object" may broadly refer to images, sounds, and even smells and tastes that are generated by devices and systems of the present disclosure. However, for ease of illustration, the present disclosure primarily describes examples where virtual objects comprise visual images.

In one example, the present disclosure provides an ONAR system that keeps track of one or more AR environments that are overlaid onto the real world, via users' AR devices. A single user may be a participant in, and associated with various AR environments. The set of users associated with each AR environment may be referred to as an AR community. In one example, the present disclosure allows a user to prioritize which AR environment will take precedence over another. For example, a user may prefer that an AR environment for the user's family takes precedence over an architecture AR environment in which the user participates. Thus, if the user is at a particular physical location in the real world, and each of the AR environments has virtual objects at the same location, the virtual object from the family AR environment will be displayed, while the virtual object from the architecture AR environment may be hidden or obscured.

In one example, certain AR environments make take precedence over others regardless of the users' preferences. For example, police or fire department messages may be placed in certain locations such that when users travel to these physical locations, the users may see certain virtual objects, e.g., comprising warning messages. For example, a frozen lake may be a popular ice skating location, but a state parks department may place a virtual warning message in an AR environment such that users participating in one or more AR communities via the ONAR system who visit the physical location of the lake will see a warning message: "Caution! No skating today due to warm temperatures and thin ice."

In one example, users of the ONAR system may generate their own AR environments and define who may be the other participants in the AR environment, or the AR community associated with the AR environment. For example, a family member may generate an AR environment for a wedding, where all of the wedding guests, and only the wedding guests, are invited to participate in the AR environment. The creator of an AR environment may also define the types of virtual objects that are permitted and that may be created, who may create virtual objects, and so forth.

The ONAR system may keep track of virtual objects that exist in one or more AR environments. This may include mapping the locations of the virtual objects in an AR environment to a real world location, tracking ownership or control of virtual objects by different users, monitoring for trigger conditions for displaying the virtual objects, monitoring for parameters for modifying or interacting with the virtual objects, and so forth.

In one example, an AR environment is created by using point-to-point mapping, where virtual objects of the AR environment are associated with physical locations, e.g., geographic coordinates, street addresses, and the like, in the real world. In one example, a physical location associated with a virtual object may comprise a set of latitude, longitude, and elevation information. In other words, there is a one-to-one correspondence between locations in the real world and locations within the AR environment. In another example, an AR environment may be mapped to different real-world environment types. For example, the AR environment may comprise certain virtual objects that are associated with mountainous regions, such that whenever there is a mountainous region in the physical world that is encountered, the associated virtual objects (e.g., a virtual volcano, a virtual waterfall, and so on) will be presented. If the user travels to the beach, other virtual objects (e.g., a virtual pirate ship, a virtual whale, a virtual leaping dolphin, and so on) associated with a "beach" real-world environment type may be presented, and so forth.

In one example, trigger conditions may be associated with various virtual objects. The trigger conditions may comprise inputs or other conditions which cause the virtual object to become visible or be presented, where previously hidden. Virtual objects may also have associated parameters for interacting with and modifying the virtual objects. The parameters may define inputs and other conditions upon which a virtual object may become mobile, e.g., the user may take control of the virtual object and move the virtual object to another location, or carry the virtual object with the user, inputs or other conditions upon which the virtual object may open, e.g., for a virtual box, the virtual object may make a noise, may transform into a different shape, color, etc., and so on. In one example, users may create their own virtual objects and may define the trigger conditions that indicate when a virtual object should be displayed and the associated parameters that indicate how the virtual object may be modified and under what circumstances.

The trigger conditions for displaying a virtual object may include at least a first trigger condition comprising a presence of a users' AR device at or near, e.g., proximate to, a physical location corresponding to a location of the virtual object. The trigger conditions may further comprise a gesture, sound, or other user input. For instance, the at least one trigger condition may comprise a first trigger condition that a user's AR device is proximate to the physical location, a second trigger condition that the user says "ta-da", and a third trigger condition that the user wave both hands. In this example, the virtual object may be displayed when all three trigger conditions are satisfied, e.g., by the user being present at the physical location with the user's AR device, and by saying "ta-da" while waving the users hands. The trigger conditions may further include a time condition, e.g., the virtual object may only be displayed after a certain time, only during certain designated times, and so forth.

The parameters for interacting with a virtual object may be similar to the trigger conditions for displaying a virtual object insofar as the parameter for interacting with the virtual object may also comprise inputs or other parameters such as: a user moving within a certain distance of a virtual object (e.g., 10 feet of the virtual object), reaching for or grabbing a virtual object (e.g., making a certain predefined arm or hand gestures), kicking a virtual object (e.g., making a certain predefined leg or foot gestures), picking up a virtual object, cutting down a virtual object (e.g., making a certain predefined arm or hand gestures or using various virtual objects such as virtual tools or weapons), shaking a virtual object, and so forth.

In accordance with the above, a trigger condition for displaying a virtual object or a parameter for interacting with a virtual object may require an action by a user, e.g., a user other than the user who created the virtual object, in order to make the virtual object visible (in the case of a trigger condition) or to activate a change in the virtual object (in the case of a parameter). In one example, a user's AR device may be equipped to recognize various gestures or movements associated with a trigger condition for displaying a virtual object or a parameter for interacting with the virtual object (e.g., gesture recognition algorithms (broadly image recognition algorithms) or via the use of various sensors such as motion sensors, light sensors and the like). For instance, if an AR device is a mobile phone, shaking the virtual object may be accomplished by standing sufficiently close to the virtual object (as detected by the location of the mobile phone) and then shaking the mobile phone from side to side. The mobile phone may detect such motion via built-in gyroscope and compass technology. The mobile phone or a component of an ONAR system may then determine that the motion comprises a specific input gesture that corresponds to a particular interaction type relating the virtual object. The trigger conditions for displaying virtual objects and the parameters for interacting with virtual objects may be defined in various ways depending upon the particular AR device technology utilized and depending upon the preferences of the user creating the virtual.

In one example, whenever a modification is made to a virtual object in an AR environment in accordance with a parameter, the modification is propagated to all users who participate in the AR environment (e.g., if the other users are within the proximate physical location of the virtual object or within view of the virtual object, e.g., shaking a virtual tree on a street by a first user can be seen by a second user walking on the same street, but a third user on a different street not in view of the virtual tree will not see the shaking of the virtual tree). In other words, in one embodiment, certain "transient" data associated with the interaction with the virtual object (e.g., the temporary swaying of the virtual tree due the shaking) can be provided only to other users who can use transient data. In another example, certain "persistent" data associated with the interaction with the virtual object (e.g., depositing a virtual item into a virtual box to be found by other users) can be provided to all users whether they are proximate to the virtual object or not.

In one example, the present disclosure provides for procedurally generated content. For example, using the real world as a physical guideline, the first user to explore a physical area that has yet to be augmented in the AR environment will "transmit" area details (e.g., images, sounds, etc.) to the ONAR system, which may then generate virtual terrain, objects, etc., which will then persist for all participants of the AR environment who visit the area. These and other aspects of the present disclosure are discussed below in connection with the examples of FIGS. 1-6.

To aid in understanding the present disclosure, FIG. 1 illustrates an example system 100 for managing the participation of users in multiple virtual environments. In one example, this may include associating a virtual object with a location, associating a virtual object with a location and with a virtual environment that is selected, and/or displaying at least one virtual object based upon a selection of priorities between two virtual environments. Although the present disclosure is discussed below in the context of a particular system or network architecture, the present disclosure is not so limited. Namely, the present disclosure can be applied to any type of communication network that is capable of transmitting data, such as a local area network (LAN), a wireless local area network (WLAN), an Internet Protocol (IP) network, such as an Internet Protocol/Multi-Protocol Label Switching (IP/MPLS) core network, an IP Multimedia Subsystem (IMS) network, communications over the Internet in general, and so forth.

As shown in FIG. 1, the system 100 connects AR devices 190-193 with one or more servers via a core network, e.g., an Internet Protocol (IP) network 110, a cellular access network 140, a wireless or wired access network 150 and/or Internet 180. In one example, cellular access network 140 may comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA2000 network, among others. In other words, cellular access network 140 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of cellular access network, in the illustrative example, cellular access network 140 is shown as a UMTS terrestrial radio access network (UTRAN) subsystem. Thus, element 145 may comprise a Node B or evolved Node B (eNodeB).

In one example, access network 150 may comprise a non-cellular access network such as a wireless local area network (WLAN), an IEEE 802.11 network, a "wired" access network, e.g., a local area network (LAN), an enterprise network, a metropolitan area network (MAN), a digital subscriber line (DSL) network, a cable network, a hybrid network utilizing a plurality of such technologies, and so forth. Thus, in one example, access network 150 may include at least one wireless communication point 155, which may comprise a wireless access point/wireless router, an IEEE 802.11 access point, a ZigBee access point, a Bluetooth or a Bluetooth Low Energy (BLE) beacon, scanner, and/or access point, and so forth. In one example, access network 150 may include multiple wireless communication points 155 of different types. Example systems of the present disclosure may include multiple wireless access networks and cellular access network that may be operated by the same or different parties. Thus, it should be noted that for ease of illustration only, a single cellular access network 140 and single access network 150 are shown in FIG. 1.

In one example, core IP network 110 comprises a telecommunication network service provider network with network devices or elements (not shown) which are capable of routing and forwarding IP packets between different hosts over the network. However, in one example, the components of core IP network 110 may have additional functions, e.g., for functioning as a public land mobile network (PLMN)-General Packet Radio Service (GPRS) core network, for providing Voice over Internet Protocol (VoIP), Service over Internet Protocol (SoIP), and so forth, and/or may utilize various different technologies, e.g., Asynchronous Transfer Mode (ATM), Frame Relay, multi-protocol label switching (MPLS), and so forth. Thus, it should be noted that although core IP network 110 is described as an Internet Protocol network, this does not imply that the functions are limited to IP functions, or that the functions are limited to any particular network layer.

In one example, AR devices 190-193 may each comprise any portable endpoint device configured for wireless communication and for the display of images, such as: headset with an image screen or projector, a laptop computer, a Wi-Fi device, a Personal Digital Assistant (PDA), a mobile phone, a smartphone, an email device, a computing tablet, a messaging device, and the like. As illustrated in FIG. 1, AR devices 190 and 191 comprise AR headsets, while AR devices 192 and 193 may comprise cellular or cellular/Wi-Fi capable smart phones or computing tablets. In one example, AR devices 190-193 may have both cellular and non-cellular access capabilities and may further have wired communication/networking capabilities. In one example, each of AR devices 190-193 may also be configured to output sound, to accept sound input, to sense certain olfactory molecules and/or to output certain scents, and so forth.

In one example, each of AR devices 190-193 may also be capable of determining a location. For instance, any one or more of AR devices 190-193 may be equipped with a global positioning system (GPS) component, or may be configured to determine a location via triangulation or other technique using measured distances between the AR device and one or more access points or base stations. In one example, a near-field communication (NFC) capability can be used to establish the physical proximity of an AR device to a sensor or beacon. For example, one of access points 155 may comprise a BLE beacon. If AR device 190 is Bluetooth enabled and is sufficiently close to the one of the access points 155, the location of AR device 190 may be accurately determined to be within a few meters (provided the location of the access point is known). In one example, each of AR devices 190-193 may calculate a device location directly, via local measurements on the device, or may receive location information from a centralized system component, e.g., an application server, as described below.

In accordance with the present disclosure, AR devices 190-193 may each run an AR application, or "local application," which enables the AR devices 190-193 to interact with an application server (AS) (e.g., any one or more of AS 120 and AS 125) for presenting one or more AR environments to users of AR devices 190-193, for enabling the user of AR devices 190-193 to interact with virtual objects of one or more AR environments, and for generating new virtual objects to be associated with one of the AR environments. In particular, in one example, the local application provides one or more of AR devices 190-193 with the ability to generate a new virtual object, to provide trigger conditions for displaying the virtual object, to provide parameters for interacting with the virtual object, to associate the virtual object with one of a plurality of different AR environments that is selected, and to convey such information to an application server. The local application may also provide one or more of AR devices 190-193 with the ability to provide location information of the AR device to the application server, and/or to receive location information of the AR device from the application server, to receive location information of one or more virtual objects from the application server, and to display virtual objects on a screen of the AR device, via a projector of the AR device, and so forth.

In one example, the telecommunication network service provider may maintain an application server (AS) 120 in the core IP network 110 for providing ONAR services, such as: generating virtual objects, associating virtual objects with physical locations and/or real-world environment types, presenting at least one virtual object based upon a selection of priorities between two or more virtual environments, determining locations of AR devices, and communicating with AR devices in connection with the abovementioned functions. Alternatively, the network service provider (e.g., the owner and/or operator of core IP network 110) may maintain AS 120 on behalf of an ONAR service provider, or on behalf of a plurality of ONAR service providers. In this regard, the application server 120 may also include a database (DB) 121 for storing information and data relating to ONAR services. In one example, AS 120 may comprise a hardware server or computer such as illustrated and described in connection with FIG. 7, and the database 121 may be any type of electronic collection of data stored on a computer-readable medium, e.g., a hardware storage device. In addition, although AS 120 is illustrated as a single device, in one example, AS 120 may comprise a plurality of physical devices co-located or distributed in several physical locations, e.g., connected through a virtual private network (VPN), a permanent virtual circuit (PVC) (in the case where core IP network 110 may also include non-IP aspects), and the like.

In still another example, an application server, e.g., AS 125, may be maintained "in the cloud," i.e., reachable via the Internet 180 in general. In one example, AS 125 is maintained by an ONAR service provider, or is maintained by another entity and performs operations controlled by the ONAR service provider or by the other entity, e.g., a cloud service provider. In one example, AS 125 may comprise a hardware server or computer such as illustrated and described in connection with FIG. 7, and the database 126 may be any type of electronic collection of data stored on a computer-readable medium, e.g., a hardware storage device. Accordingly, AS 125 may provide the same or substantially similar functions as AS 120, as described herein. Like AS 120, AS 125 may also comprise a plurality of servers co-located or distributed in several physical locations. In addition, it should be noted that the system 100 may be implemented in a different form than that illustrated in FIG. 1, or may be expanded by including additional endpoint devices/AR devices, access networks, network elements, application servers, etc. without altering the scope of the present disclosure.

Figure 2:
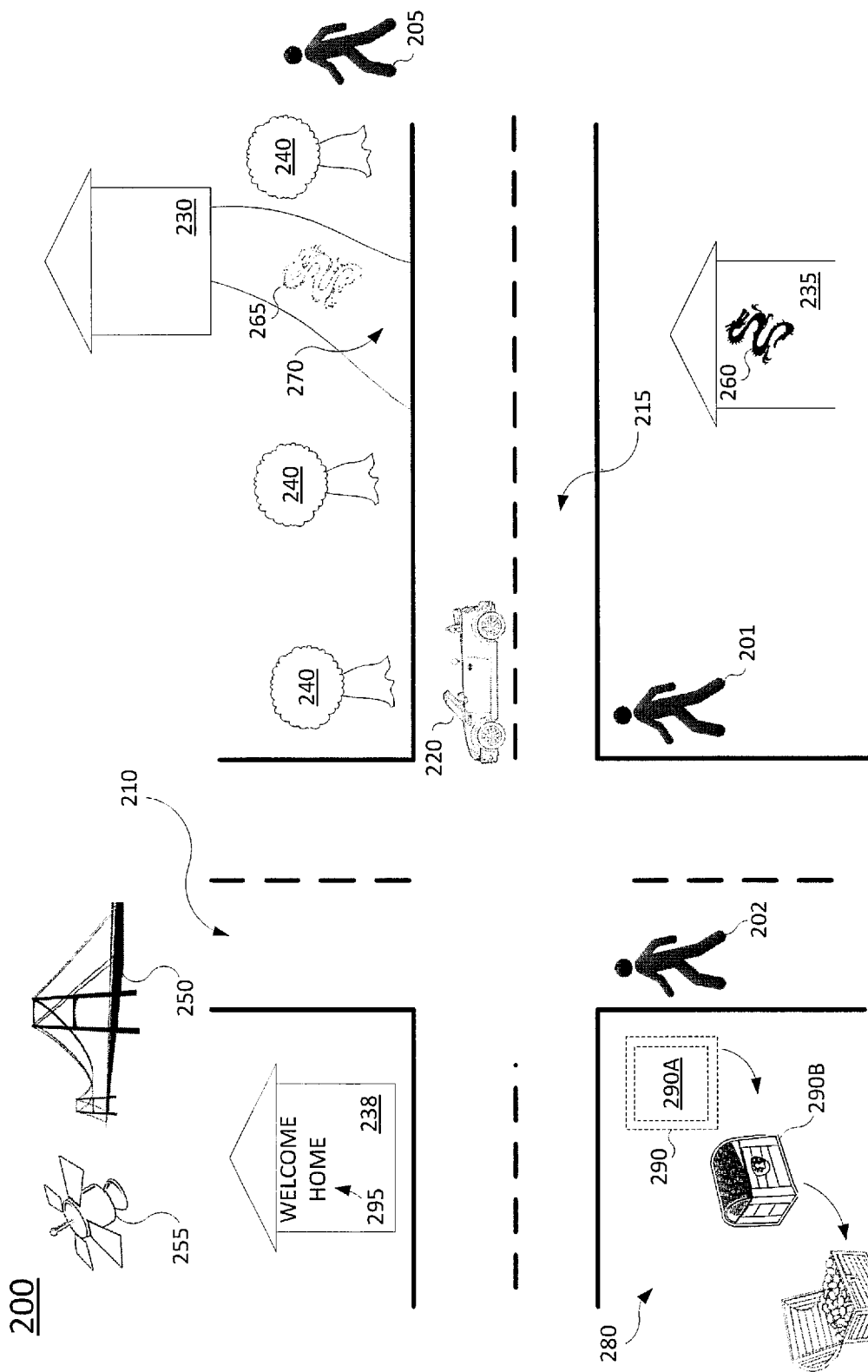
FIG. 2 illustrates an example environment comprising multiple virtual environments projected onto a physical environment.

FIG. 2 illustrates an example environment 200 that includes a real-world, physical environment and two AR environments. For instance, environment 200 may represent the experience of a first user 201 who is a member of two different AR communities. The first AR community may be an architecture AR community for users such as architects, landscape designers, and the like, and for those who are interested in the works of such users. The second AR community may be a family-based AR community for the family of first user 201. As illustrated in FIG. 2, the physical environment may include roads 210 and 215, car 220, and houses 230, 235, and 238. In the example of FIG. 2, house 238 may comprises the home of first user 201, while houses 230 and 235 may be neighbors' homes. Each AR environment may comprise one or more virtual objects. For example, the architecture AR environment may include several virtual objects, such as trees 240 and walkway 270. For instance, house 230 may be for sale and a second user 205, e.g., an architect or landscaper, may wish to share a vision of the house 230 with some improvements. Therefore, a brick walkway 270, e.g., a first virtual object, on the front yard of house 230 and several trees 240, e.g., additional virtual objects, may be added to the architecture AR environment to allow others to imagine what the area might look like with some improvements, and to showcase some of the creative talents of second user 205. Second user 205 is depicted as being located near house 230 to illustrate that in one example, a user associates a virtual object with a location by being physically present at the location.

The family-based AR environment may include a virtual object, e.g., a dragon 260, placed in front of a neighbor's house, e.g., house 235. For example, the first user 201 may create and place the dragon 260 to "defend" house 235 and to remind the children of first user 201 that they should not cut across the neighbor's property. First user 201 may also place a second dragon 265 in front of house 230 for a similar purpose.

The first user 201 may also place a virtual object, e.g., a treasure chest 290, within the family-based AR environment. For example, treasure chest 290 may be placed in a park 280 that is located across the street from the house 238 of the first user 201. As mentioned above, a user may create a virtual object, "place" the virtual object at a location, i.e., associate the virtual object with the physical location, and may define various trigger conditions with respect to the presentation of virtual object and/or define various parameters associated with manipulating and interacting with the virtual object. For example, the treasure chest 290 may initially be "hidden" as indicated at 290A. The first user 201 may define a trigger condition as a user of the family-based AR community moving within a certain distance of the location of the treasure chest 290, and may define that the treasure chest 290 should become visible when the trigger condition is satisfied. For instance, the child 202 of the first user 201 may walk through the park 280 and approach the physical location associated with the hidden treasure chest 290, at which time the treasure chest may transform from hidden, e.g., 290A, to being visible as indicated by 290B.

The first user 201 may also define parameters for interacting with the treasure chest 290. For example, a parameter may comprise receiving of an input comprising a key-turning motion detected on an AR device at the physical location of the treasure chest 290, upon which the treasure chest 290 is to transition from "visible and closed," e.g., as illustrated by 290B, to "visible and open," e.g., as illustrated by 290C. For instance, if an AR device of child 202 is a mobile phone, "opening" the treasure chest 290 may be accomplished by standing sufficiently close to the treasure chest 290 (as detected by the location of the mobile phone) and then turning the mobile phone as if rotating a knob or a large key.

In one example, whenever a modification is made to a virtual object in an AR environment, the modification is propagated to all users who participate in the AR community associated with the AR environment. Thus, for example, when child 202 causes the treasure chest 290 to become visible (290B), the treasure chest 290 will from then on be visible to all users in the family-based AR community who approach the location of the treasure chest 290, including the first user 201 who created the treasure chest 290. Other users who are participants in other AR communities will not see the treasure chest 290. For example, second user 205 will not see the treasure chest 290.

The trigger conditions for displaying a virtual object and the parameters for interacting with the virtual object may be defined in various ways depending upon the particular AR device technology utilized and depending upon the preferences of the user creating the virtual object. For example, if the AR device of child 202 comprises an AR headset, the movement of the hands of child 202 may be detected via a camera of the AR headset and correlated to a gesture or movement that may comprises a parameter for interacting with the virtual object. When treasure chest 290 is "opened," it will from then on be visible as open, in the form of 290C, to all users participating in the family-based AR environment.

The family-based AR environment may also include other virtual objects, such as a bridge 250 and a satellite 255, which may be created and placed by child 202 in the locations depicted in environment 200. Child 202 may also place a welcome home sign 295 as a virtual object over house 238. For example, the first user 201, the parent of child 202, may be returning home from a trip and the child 202 may want to surprise the parent, first user 201, with a large "welcome home" sign. The welcome home sign 295 will be visible to all participants of the family-based AR environment, but will not be seen by other users in other AR environments, e.g., second user 205. Conversely, participants in the architecture AR environment will see virtual objects of the architecture AR environment, while other users will not. Thus, for instance, first user 201 and second user 205 will see the trees 240 and walkway 270, while child 202, who is not a participant in the architecture AR community, may not see these virtual objects.

As mentioned above, one aspect of the present disclosure is the ability of a user to prioritize between different AR environments in which the user is a participant. Thus, for example, first user 201 may select which AR environment should be visible, from among the different AR environments in which the first user 201 participates. For instance, first user 201 may select to have the family-based AR environment visible, while the architecture AR environment is to be hidden. Thus, if the first user 201 is walking through the environment 200, the first user 201 may see dragon 260, second dragon 265, treasure chest 290, bridge 250, satellite 255, and welcome home sign 295, while trees 240 and walkway 270 will not be displayed by the AR device of the first user 201. At some other time, the first user 201 may change the selection, such that the virtual objects of the architecture AR environment are visible (e.g., those virtual objects whose trigger conditions may have been satisfied), while the family-based AR environment and all of its virtual objects are hidden. In still another example, the first user 201 may select to have more than one AR environment visible at the same time. For instance, both the family-based AR environment and the architecture based AR environment may be visible as the user 201 transits through environment 200 (e.g., including those virtual objects from the family-based AR environment whose trigger conditions have been satisfied and those virtual objects from the architecture based AR environment whose trigger conditions have been satisfied). Additional AR environments may also be displayed at the same time, or hidden, according to the preferences of user 201.

As also mentioned above, a user may prioritize between different AR environments that are simultaneously visible when there is a conflict between virtual objects of the different AR environments in the same location. For example, user 201 may have placed a second dragon 265 in front of the house 230 in the family-based AR environment, but the second dragon 265 would interfere with the walkway 270 placed by the second user 205 in the architecture AR environment. User 201 may have selected to have both AR environments visible, but to have the architecture AR environment take precedence. Therefore, the second dragon 265 of the family-based AR environment may be hidden so that walkway 270 is fully visible. In one example, an indicator, such as a small blinking light may be presented in the location next to or near the virtual object that is displayed to indicate that another virtual object for a different AR environment is available, but hidden. In another example, the virtual object of the AR environment with a lower priority or precedence may still be made visible, but may be made faded, transparent, or shown in outline form, or may be shown in black and white, instead of color, and so forth. For example, in FIG. 2 the second dragon 265 is illustrated as transparent with respect to walkway 270.

Figure 3:
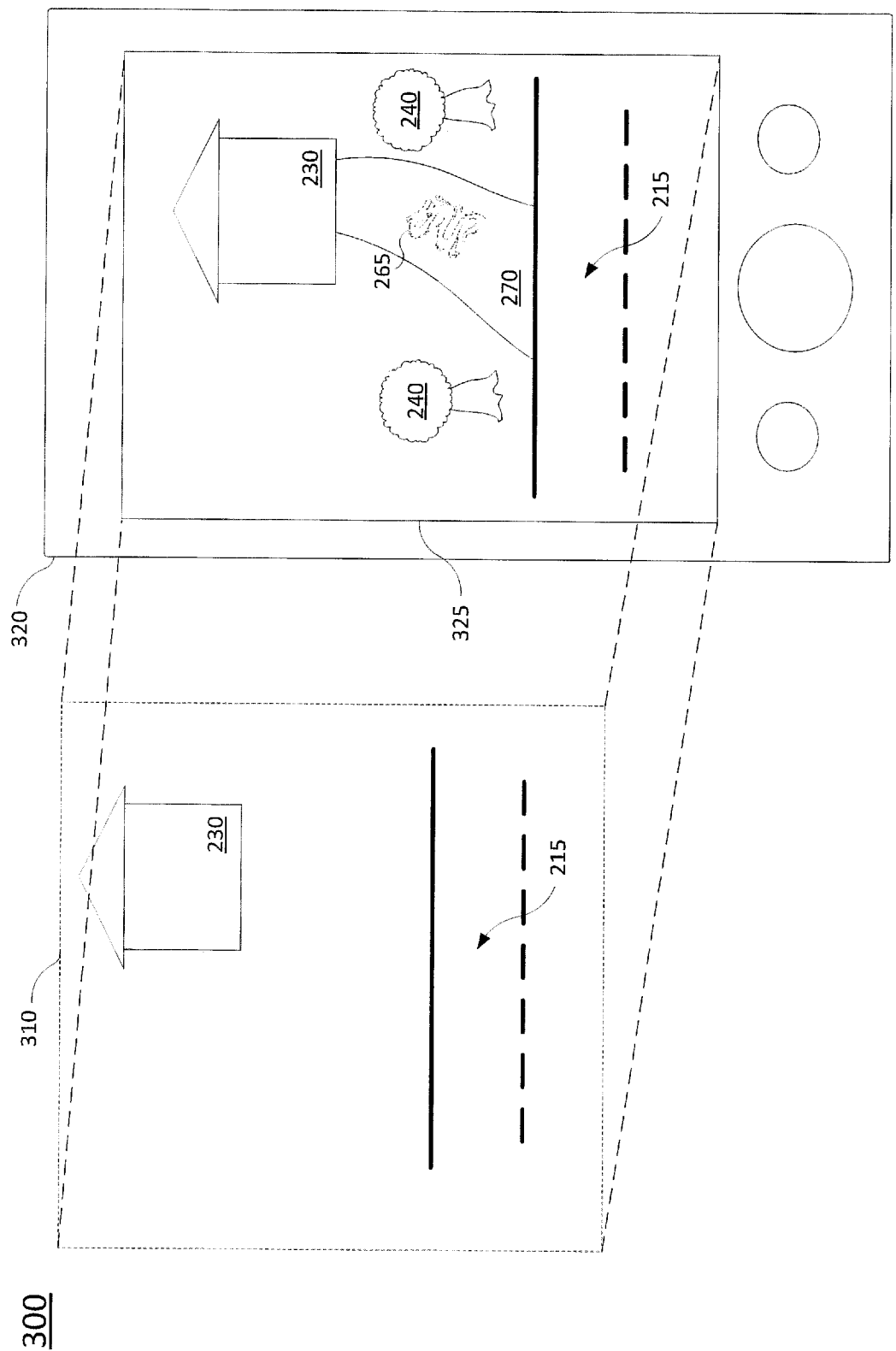
FIG. 3 illustrates an example environment that includes a physical environment and a device for presenting example virtual environments.

Continuing with the same example, FIG. 3 illustrates an environment 300 that includes a physical environment 310 and a device 320, e.g., an AR device, for presenting AR environments on a display screen 325. In the present example, the display screen presents images from physical environment 310 combined with virtual objects from the family-based AR environment and the architecture AR environments in which the first user 201 of FIG. 2 participates. For example, device 320 may comprise an AR device of the first user 201 of FIG. 2. The images of the physical environment 310 and the virtual objects on display screen 325 may correspond to the same images and virtual objects that appear in FIG. 2. For example, real world environment 310 may include house 230 and road 215, which are the same as shown in FIG. 2. The first user 201 may be standing across the road 215 from house 230 and be looking in the direction of house 230 in FIG. 2. As shown in FIG. 3, in the physical environment 310, road 215 and house 230 are visible. For instance, a rear-facing camera on the device 320 may be pointed in the direction of house 230 and may capture the image(s) of physical environment 310 as shown.

In the present example, the first user 201 may have selected to have both the family-based AR environment and the architecture AR environment presented simultaneously, with the architecture AR environment taking precedence. Thus, on the display screen 325, the images of physical environment 310 are shown, i.e., the house 230 and road 215. In addition, the walkway 270 and trees 240 of the architecture AR environment that are within the field of view are also presented on display screen 325. The second dragon 265 of the family-based AR environment is also presented on display screen 325. However, the second dragon 265 may be presented in a transparent or faded form, according to the preferences of the first user 201. In another example, the second dragon 265 may not be presented at all, if the architecture AR environment is selected to have precedence.

It should be noted that the examples of FIGS. 2 and 3 are provided for illustrative purposes. Thus, in accordance with the present disclosure, a variety of different types of AR environments and virtual objects may be provided which are different from those depicted in FIGS. 2 and 3. In addition, a variety of different types of AR devices in a different form than that illustrated in FIG. 3 may be utilized without altering the scope of the present disclosure. For example, FIG. 3 illustrates an AR device 320 capturing and displaying real world images on display screen 325. However, in another example an AR device may simply present virtual objects in the form of visible images to a user, where real-world images are received by the user's eyes without any intermediation by an AR device, or any other device. For instance, images may be displayed by a projector of an AR headset.

It should also be noted that in various examples, the AR devices of the various users in FIG. 2 may be interacting with one or more servers for receiving and/or reporting location information, for receiving data pertaining to virtual objects, and their trigger conditions and parameters, for reporting inputs via the AR devices, and so forth.

Figure 4:
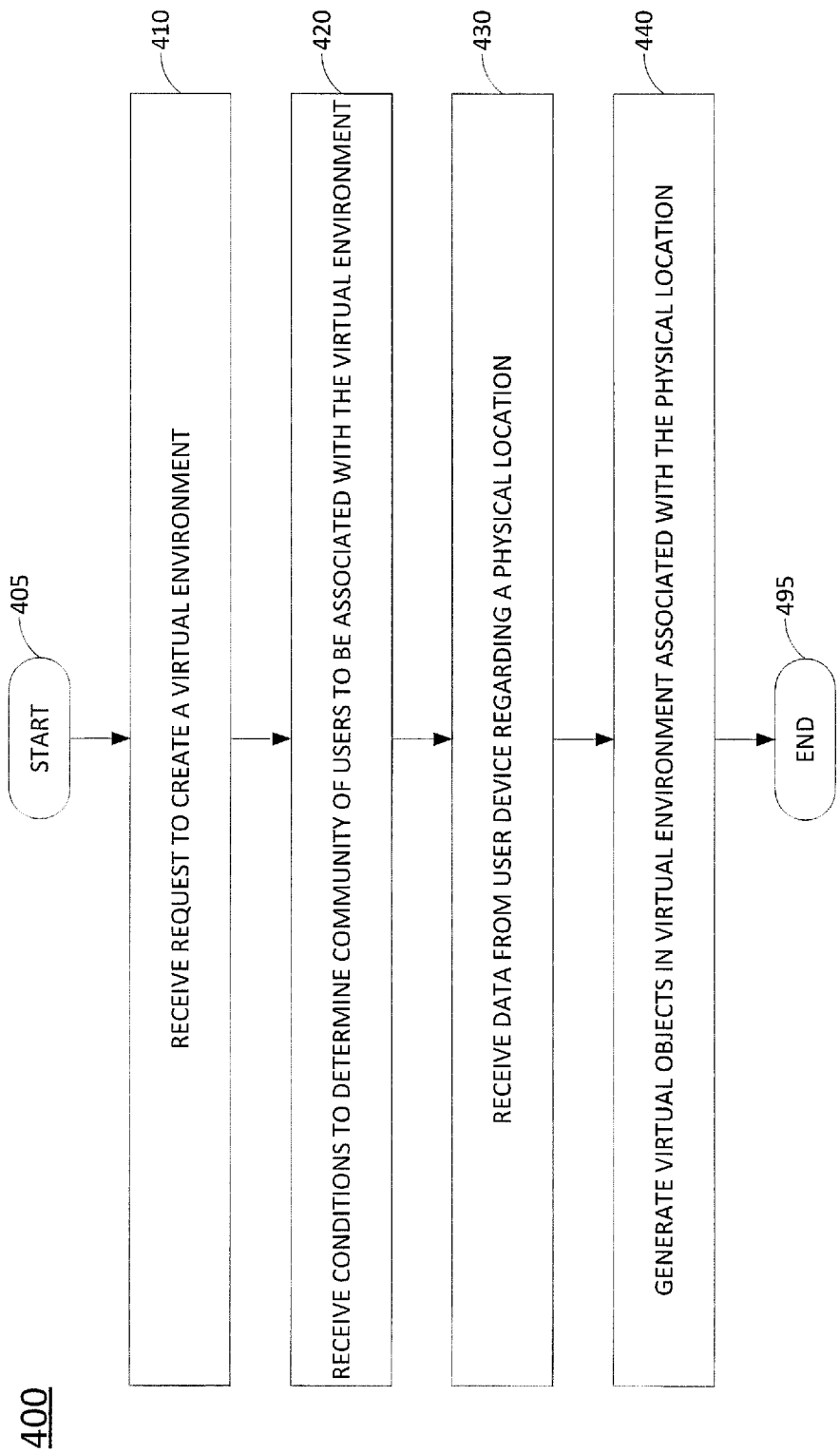
FIG. 4 illustrates an example flowchart of a method for associating a virtual object with a location, according to the present disclosure.
Figure 7:
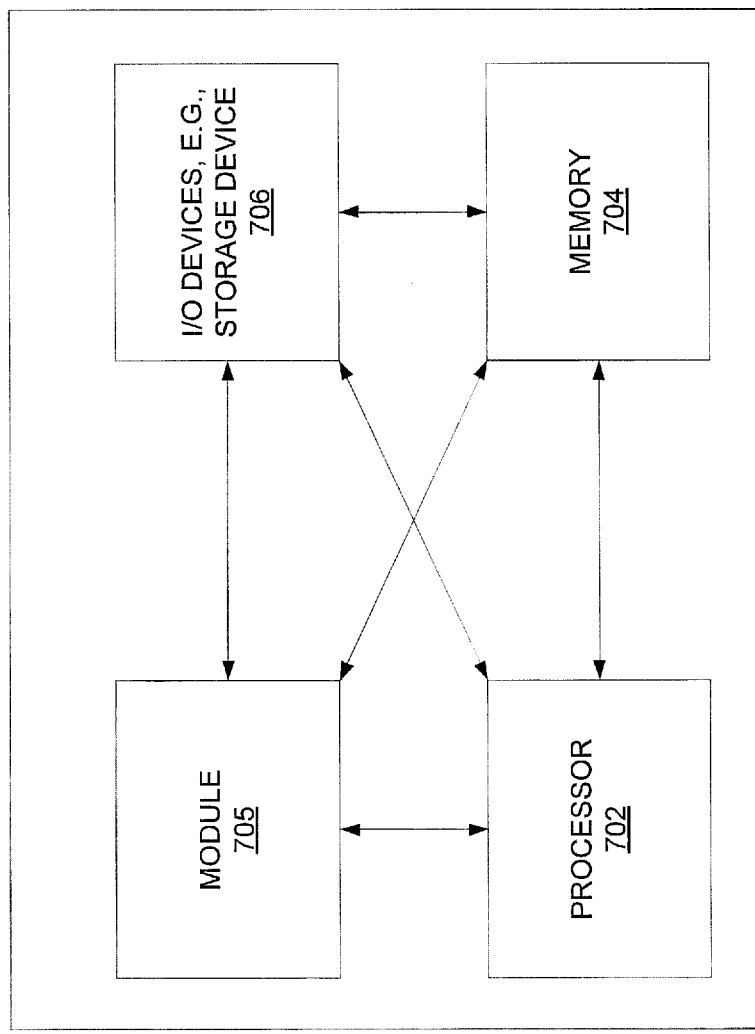
FIG. 7 illustrates an example high-level block diagram of a computing device for performing the functions, methods, operations and algorithms described herein.

FIG. 4 illustrates an example flowchart of a method 400 for associating a virtual object with a location. In one example, the steps, operations, or functions of the method 400 may be performed by AS 120 or AS 125 of FIG. 1, e.g., an ONAR server. Alternatively, one or more steps, operations, or functions of the method 400 may be implemented by a computing device having a processor, a memory, and input/output devices as illustrated in FIG. 7 and described below, specifically programmed to perform the steps, functions, and/or operations of the method. For illustrative purposes, the method 400 will now be described in terms of an example where operations of the method are performed by a processor, such as processor 702 of FIG. 7.

The method 400 begins in step 405 and proceeds to step 410. In step 410, the processor receives a request to create an AR environment, e.g., a virtual environment. In one example, the request is received from a device of a first user. In one example, the device of the first user may comprise an AR device. Alternatively, or in addition, the device of the first user may comprise a desktop computer, a laptop computer, a portable computing device, and so forth. In one example, the request may include a title of the AR environment, a duration of the AR environment, a theme of the AR environment, and a geographic boundary of the AR environment, and/or other features.

The duration of the AR environment may relate to how long the AR environment should persist. For example, the first user may select that the AR environment should end and no longer be available after three weeks, three months, six months, or any other duration of time. In one example, the theme of the virtual environment may be selected by the user, such as a family-based theme, an architecture based theme, and so forth. For instance, the user may select from a number of preexisting themes, or may create an entirely new theme. In one example, the geographic boundary of the AR environment may correspond to "real-world" physical geography. For example, the first user may be a parent creating a family-based AR environment, and the first user may not want the children to wander outside of the immediate neighborhood of the family's house. In one example, the geographic boundary may be selected by indicating a maximum radius from a current location of the first user, or from another selected location. In another example, the geographic boundary may be selected by presenting the first user with a map, where the user may define a closed shape, using any of the roads or other geographic features, such as a river, an ocean, etc., as a border of the closed shape.

At step 420, the processor receives conditions to determine a community of users to be associated with the virtual environment. In one example, the conditions may be received as part of the request received at step 410. In another example, the processor may prompt the first user to select particular users who are permitted to participate in the AR environment. For instance, the first user may select only the family members of the first user to join the community associated with a family-based AR environment to be created by the first user. In another example, the first user may define rules that the processor may use to determine who is permitted to join the community. For instance, the first user may be creating an architecture related AR environment and may want to restrict joining to only users who are over 18 years of age. For example, the first user may wish to avoid adolescents creating "graffiti" by placing visual objects that detract from the AR environment, rather than those that would benefit the AR environment by enhancing the real-world environment with interesting and attractive structures.

It should be noted that where the present disclosure describes interactions between a processor or other device, and a user or a user device, the interactions may comprise various different types of wired and/or wireless communication between devices over a network. As just one example, the processor may transmit an extensible markup language (XML) file via transmission control protocol/internet protocol (TCP/IP) to the user device via one or more networks, where the XML file may cause an application on the user device to display an interactive form, e.g., with one or more fields for the user to complete and return to the processor.

At step 430, the processor receives data from a user device regarding a location, i.e., a real-world, physical location. The device may be a same device from which the request to create the virtual environment is received at step 410, or a different device. For example, the first user may submit the request to create the virtual environment using a desktop computer, while the data regarding the physical location may be sent from a mobile, wireless communication-capable AR device. In one example, the user device may be a device of a different user than the first user. In one example, the user device may transmit information regarding the surrounding of the user device, such as by transmitting a video feed, or a series of one or more pictures captured by the user device. In one example, the data regarding the physical location may include GPS location information of the user device, e.g., GPS coordinates. In another example, the data regarding the physical location may include signal strength information from a plurality of nearby cellular base stations, e.g., to permit the processor or other network-based component to determine the location of the user device via triangulation, or using similar techniques.

At step 440, the processor generates at least one virtual object in the AR environment associated with the physical location. For example, the processor may pre-populate the AR environment with one or more virtual objects, e.g., based upon the theme that is selected. For example, the processor may place virtual objects comprising bushes and flowers at various locations within the AR environment when the AR environment is an architecture themed AR environment. In other words, in one example, a device of a first user who is a participant in the AR environment and who travels to a particular real-world location is tasked with gathering visual and other data of the location and transmitting the data regarding the location to the processor. In turn, the processor may generate virtual objects and place the virtual objects accordingly. For instance, the processor will not place a virtual object comprising a new tree in the middle of a road. Similarly, the processor will not place such a virtual object on top of an existing tree. Thus, using cues from the real-world physical environment at the location, the processor may place a virtual object where it does not conflict with features of the physical environment.

The processor may receive similar data regarding other physical locations from the same user device and/or from other user devices as these devices traverse the physical environment. In this way, the processor may generate a more interesting AR environment for the users, e.g., for when the AR environment is first being developed, and before the users have had the opportunity to generate and place many user-created virtual objects throughout the AR environment.

Following step 440, the method 400 proceeds to step 495 where the method ends.

Figure 5:
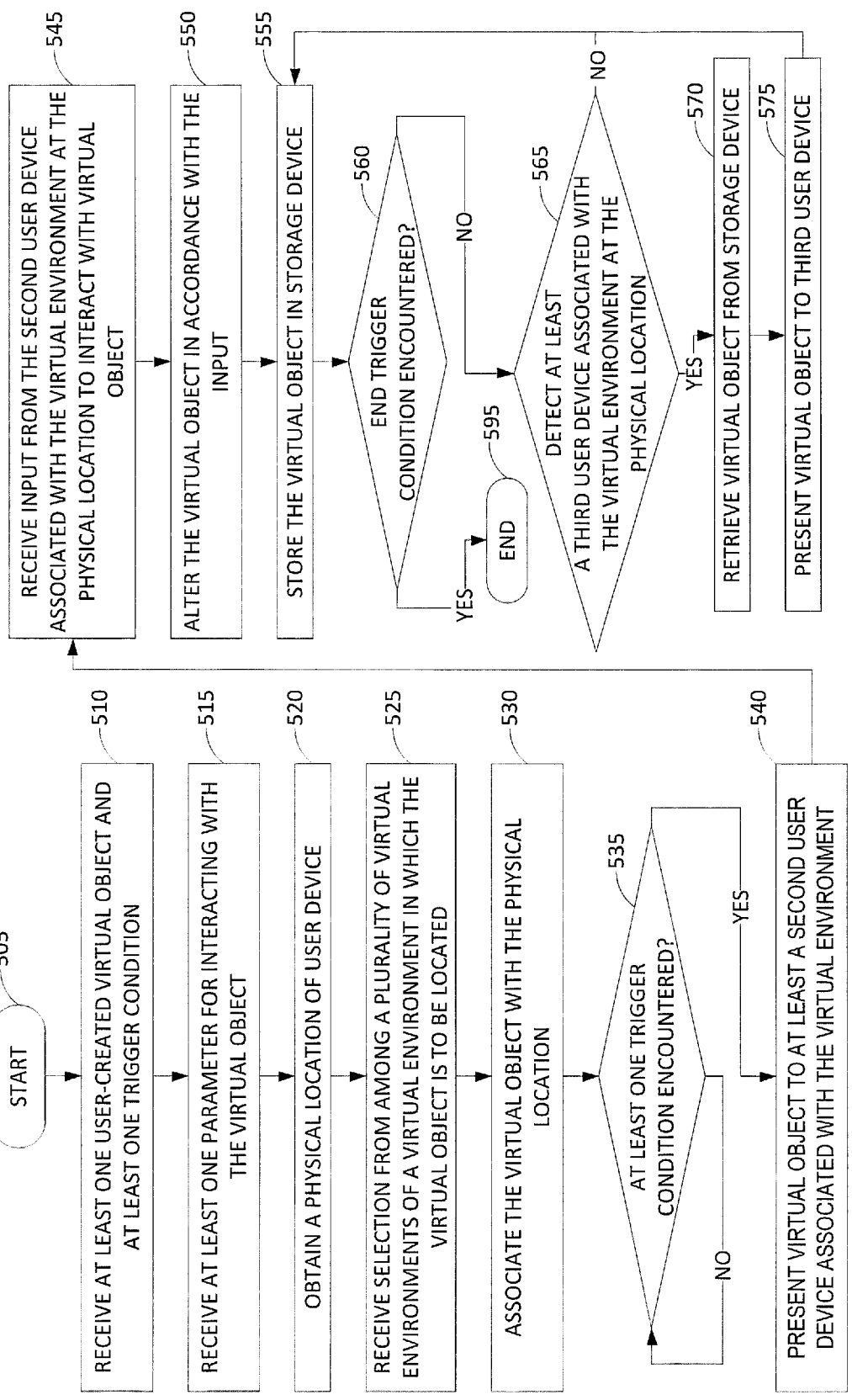
FIG. 5 illustrates an example flowchart of a method for associating a virtual object with a location and with a virtual environment that is selected, according to the present disclosure.

FIG. 5 illustrates a flowchart of an example method 500 for associating a virtual object with a location and with a virtual environment that is selected. In one example, the steps, operations, or functions of the method 500 may be performed by AS 120 or AS 125 of FIG. 1, e.g., an ONAR server. Alternatively, one or more steps, operations, or functions of the method 500 may be implemented by a computing device having a processor, a memory, and input/output devices as illustrated in FIG. 7 and described below, specifically programmed to perform the steps, functions, and/or operations of the method. For illustrative purposes, the method 500 will now be described in terms of an example where operations of the method are performed by a processor, such as processor 702 of FIG. 7.

The method 500 begins in step 505 and proceeds to step 510. In step 510, the processor receives from a first user device at least one user-created virtual object and at least one trigger condition associated with the virtual object. In one example, the at least one virtual object that is received may comprise one or more images that are created by a first user or selected by the first user from a set of one or more predefined images. The one or more images may be static, or may comprise moving images or animations.

In one example, the at least one trigger condition may comprise a condition for displaying the at least one virtual object. In one example, the at least one trigger condition includes a trigger condition that a user device is proximate to a physical location associated with the user device. For example, the first user may create a hidden treasure chest. In addition, the first user may define a trigger condition that the treasure chest should appear if a user device, e.g., an AR device, of a different user is within three meters of the virtual object. In another example, the first user may define the at least one trigger condition to comprise that the at least one virtual object, such as a treasure chest, should appear when there are at least two user devices within three meters of the at least one virtual object at the same time. In another example, the first user may define the at least one trigger condition to comprise that the at least one virtual object should appear when the $100^{th}$ user device approaches within three meters of the virtual object. For example, the first user may want to have every $100^{th}$ visitor to a particular location to be a "winner." In still another example, the at least one trigger condition may be defined by the first user such that the at least one virtual object should appear at a certain time, or at certain times. In one example, the at least one trigger condition may further specify a duration for which the at least one virtual object should appear. For example, the at least one trigger condition may specify that the at least one virtual object should appear at the top of every hour for a five minute time period, and then disappear until the top of the next hour. For instance, the at least one virtual object may be a virtual "cuckoo clock."

At step 515, the processor receives at least one parameter for interacting with the at least one virtual object. In one example, the at least one parameter may be received from the first user device in a same communication as the at least one virtual object and the at least one trigger condition. The at least one parameter may be associated with at least one alteration or transformation of the virtual object in response to the at least one parameter. For example, the first user may create the at least one virtual object such that the at least one virtual object can be transformed in a number of different ways. For instance, the at least one virtual object may comprise a treasure chest. The at least one virtual object, e.g., the treasure chest, may have several different states, such as a hidden state, a closed state, and an open state. As mentioned above, a trigger condition may comprise a user device approaching within a certain distance of the treasure chest, upon which the treasure chest will appear. Thus, the treasure chest may transition from the hidden state to the closed state, where the treasure chest is visible, but closed such that any contents of the treasure chest still cannot be seen. However, when a parameter for interacting with the treasure chest is met, the processor may cause the treasure chest to "open," e.g., to transition from the closed state to the open state. In the open state the treasure chest and its contents may be visible. Thus, for example, the least one virtual object may not comprise a static image, but may comprise a set of one or more images, one or more trigger conditions, one or more parameters for interacting with the virtual object, and so forth.

In one example, the at least one parameter may comprise a presence of a user device within a proximity of the at least one virtual object. In one example, the at least one parameter may further include a time parameter. For instance, the virtual object may be defined to be static for 30 minutes of every hour, where no interactions are permitted, and non-static for 30 minutes of every hour, where the at least one virtual object may be changed, moved, and so forth. In one example, the at least one parameter may comprise a gesture or series of gestures, which, when performed by a user, result in a manipulation of the at least one virtual object. For instance, a user device may record that the user is making a turning motion with his or her hand. This turning motion may comprise a parameter for causing a treasure chest virtual object to transition from "closed" to "open," e.g., the gesture simulating the user turning a key and opening a lock.

In still another example, the at least one parameter may comprise an input on a user device. For instance, the at least one virtual object may comprise a wrapped gift package where defined interactions that are permitted with the virtual object include "shaking" the package and "opening" the package. If the user device comprises a smartphone, the user may shake the smartphone from side to side. This input may be received and correspond to the parameter which may result in the at least one virtual object appearing to shake. In one example, a sound may accompany the visual shaking. For instance, the first user may record a sound to be associated with the shaking motion of the at least one virtual object.

The foregoing are only a few examples of the types of trigger conditions and parameters that may be defined in association with a virtual object. Thus, various other trigger conditions and parameters may be implemented in accordance with the present disclosure based upon the preferences of the first user creating/defining the at least one virtual object, depending upon the type(s) of AR devices of the users and their capabilities, and so forth. In addition, it should be noted that the processor may receive data from the user device pertaining to the device usage, and analyze the device usage to determine whether any keypad or touchscreen inputs, voice commands, gestures or other motions made with the device correspond to one of the trigger conditions or parameters. If a trigger condition or parameter is met, the processor may then send further instructions to the user device to cause the corresponding display and/or change in the at least one virtual object to be performed on the user device.

At step 520, the processor obtains a physical location of a user device of the first user. For example, an AR device of the first user may determine its location via a GPS receiver, base station triangulation, or other means, and report the location, e.g., coordinate information, to the processor. In another example, network-based components may receive communications from the user device, from which the location of the user device may be determined. For instance, one or more network-based components may use triangulation techniques to determine a location of the user device based upon a received signal strength at one or more base stations, and so forth. The processor may perform the location determination, or the location determination may be made by one or more other network-based components, which forward to the processor the location that is determined.

At step 525, the processor receives a selection from among a plurality of virtual environments of a virtual environment in which the at least one virtual object is to be located. In one example, the selection may be received from the user device of the first user. For instance, the first user may participate in a number of different virtual environments (AR environments). Therefore, the first user creating the at least one virtual object may be required by the processor to clarify which virtual environment should receive the at least one virtual object. For instance, the processor may receive a selection that indicates that the at least one virtual object is for a family-based virtual environment, rather than a different virtual environment in which the first user is a participant.

At step 530, the processor associates the at least one virtual object with the physical location and with the virtual environment that is selected. As mentioned above, in one example, there is a one-to-one correspondence between physical locations in the real-world and locations within the virtual environment. Thus, in one example, the first user may go to the physical location in order to "place" the at least one virtual object in this location, e.g., to associate the virtual object with the physical location. However, in another example, the first user may place a virtual object at any location, without having to actually travel to the corresponding physical location with the first user's AR device. For instance, the processor may present the first user with a map corresponding to the real-world physical locations upon which the user may select a location to place the virtual object.

At step 535, the processor determines whether the at least one trigger condition for the at least one virtual object is encountered. For example, if the at least one trigger condition comprises a user device coming within a certain threshold distance from the location of the at least one virtual object, the processor may detect that the at least one trigger condition is satisfied when a location of a user device of a second user is detected as being within the threshold distance. In another example, the at least one trigger condition may comprise a user device being within a certain distance of the virtual object and taking some additional action, such as making a particular gesture or speaking a particular command. In still another example, the at least one trigger condition may comprise at least one user device being within a certain distance of the virtual object and a time condition. For example, when the processor detects that time has advanced to the particular time and at least one user device is proximate to the physical location, the processor may therefore determine that the at least one trigger condition has been encountered. If the processor does not detect that the at least one trigger condition is encountered, the processor continues to wait at step 535 and check if the at least one trigger condition is encountered at a subsequent time. When the at least one trigger condition is encountered, the method proceeds to step 540.

At step 540, the processor presents the at least one virtual object to one or more user devices associated with the virtual environment that are proximate (e.g., within a certain distance of the physical location, e.g., within 3 feet, 5 feet, 10 feet, 15 feet, or 20 feet and so on) the physical location, e.g., user devices of users who participate in the virtual environment. Thus, in one example, step 540 comprises the processor presenting the at least one virtual object to at least a second user device associated with the virtual environment that is proximate or present at the physical location. In one example, the at least a second user device may be a user device that caused the at least one trigger condition to be satisfied, e.g., due to the proximity of the user device to the physical location, and possibly due to satisfying one or more additional trigger conditions.

In one example, the presenting the virtual object to the one or more user devices comprises transmitting the virtual object to the one or more user devices for presentation via respective displays, speakers, and other output modalities of the respective user devices. Notably, in one example, the at least one virtual object is not just presented to a user device of a user that has caused the at least one trigger condition to be encountered (and which is therefore already determined to be at the physical location), but may be presented to all user devices that participate in the virtual environment and that are near enough to see the physical location corresponding to the location of the at least one virtual object. The locations of the user devices may be determined in the same or a similar manner as described above in connection with step 520 for determining the location of the user device of the first user. In one example, the size of the at least one virtual object may be scaled for different user devices depending upon the respective distances from the location of the at least one virtual object. In one example, the scaling may be performed by the processor based upon a calculation of the distances between the user devices and the location of the at least one virtual object. However, in another example, the scaling may be performed by each user device in a similar manner.

At step 545, the processor receives an input from a user device of a participant of the virtual environment that is at the physical location, e.g., a user device of a participant that caused the at least one trigger condition to be satisfied or a user device of another participant, where the input is for interacting with the at least one virtual object. In one example, the input may be in accordance with the at least one parameter for interacting with the virtual object that is received at step 515. For instance, as mentioned above, the first user may define a parameter for interacting with a treasure chest virtual object to comprise a turning motion made via a user device, which may cause the treasure chest to open, as if the user has turned a key in to release a lock. Thus, the processor may receive an input from the user device of a second user that indicates that the user device is being rotated. In still another example, step 545 may comprise receiving inputs from at least two user devices. For instance, a parameter for interacting with a virtual object may comprise coordinated inputs from a user device of a second user and a user device of at least a third user.

At step 550, the processor alters the at least one virtual object in accordance with the input. For instance, if the input is a turning motion corresponding to a parameter for opening a treasure chest virtual object, the processor may cause the presentation of the image of the treasure chest to change from closed to open. In another example, the input may comprise a shaking of the user device of the second user, which may correspond to a parameter for causing a gift package virtual object to shake and/or make a rattling noise. As such, at step 550, the processor may cause the gift package to change from a static image to a shaking animation, and may alternatively or additionally cause the user device of the second user to play the rattling sound. In one example, the at least one virtual object is altered as it is displayed and/or otherwise presented on the user device of the second user. In one example, the at least one virtual object is altered as it is displayed and/or otherwise presented on the user device of the second user and the user device of at least a third user, e.g., where the parameter is satisfied by coordinated inputs from at least two user devices. Notably, in one example, the processor may also alter the at least one virtual object insofar as it is presented via the user devices of other users in the community that are at or near the location of the at least one virtual object. For instance, if other users and their user devices are within 10 meters of the virtual object, the processor may cause the other user devices to present the alteration of the virtual object, e.g., by animating the virtual object, presenting the same audio that is presented to the second user via his or her user device, and so forth.

In one example, the alteration may comprise the at least one virtual object becoming mobile. For instance, the parameter may comprise an input from a user device to "pick up" the at least one virtual object, such as pressing a key, entering a code, making a particular gesture, or speaking a particular command, upon which the at least virtual object may move within the virtual environment as the second user move within the real-world physical environment. Thus, the second user may see that the at least one virtual object appears to be moving along with the second user as the second user changes perspectives and moves throughout the real-world. Other users may also see, via their respective user devices, that the at least one virtual object is moving with the second user and the second user's mobile device.

In still another example, the input may comprise a swinging motion, a chopping motion, or a smashing motion, which may cause a virtual object to appear to be destroyed. For example, a tree virtual object may be cut down, a porcelain virtual object may be shattered, and so forth via such inputs. Again, the permitted and possible types of alterations and the changes of the at least one virtual object from one state to another may be controlled by first user according to the information received by the processor at steps 510-525.

At step 555, the processor stores the at least one virtual object in a storage device. For example, the processor may store the at least one virtual object and any associated data, such as one or more image, video, sound, and/or animation files corresponding to different states of the at least virtual object, trigger conditions, parameters for interacting with the at least one virtual object, and so forth in a memory, such as a read-only memory (ROM), a magnetic or optical drive, a diskette, and the like. In one example, the storage device may comprise a single physical device. However, in another example, the storage device may comprise a plurality of physical devices co-located in proximity to one another, or distributed at a plurality of different sites.

At step 560, the processor determines whether an end condition is detected. For instance, the first user may define a condition for ending the virtual object, upon which the virtual object may no longer be discovered or presented to other user devices. In one example, the end condition may be received in step 510 or step 515, and may be stored at step 555 along with the at least one virtual object and other associated data. The end condition may comprise, for example, one of the parameters for interacting with the virtual object. For instance, a cutting motion for chopping down a tree virtual object may not only cause the tree to appear to be cut down, but may also result in the tree virtual object being removed entirely from the virtual environment if the cutting down of the tree is also an end condition.

When an end condition is detected at step 560, the method 500 proceeds to step 595 where the method ends. Otherwise, the method 500 proceeds to step 565.

At step 565, the processor determines whether a user device associated with the virtual environment is detected at the physical location, i.e., a user device of a user in the community associated with the virtual environment. For example, step 565 may comprise similar operations to those described above in connection with steps 520 and 540. When a user device is not detected at the physical location, the method 500 returns to step 555. When a user device is detected at the physical location, the method 500 proceeds to step 570.

At step 570, the processor retrieves the virtual object from the storage device. For instance, the processor may access a memory and retrieve a file comprising the virtual object and associated data.

At step 575, the processor presents the virtual object to the user device. For instance, all or a portion of the virtual object and associated data may be transmitted by the processor to the user device to cause the user device to present the virtual object to the associated user. Following step 575, the method 500 returns to step 555. When step 560 is reached, it is again determined whether an end condition is encountered. When no end condition is encountered, the method 500 continues with steps 565, etc. However, as mentioned above, when the end condition is encountered, the method 500 proceeds to step 595 where the method ends.

Figure 6:
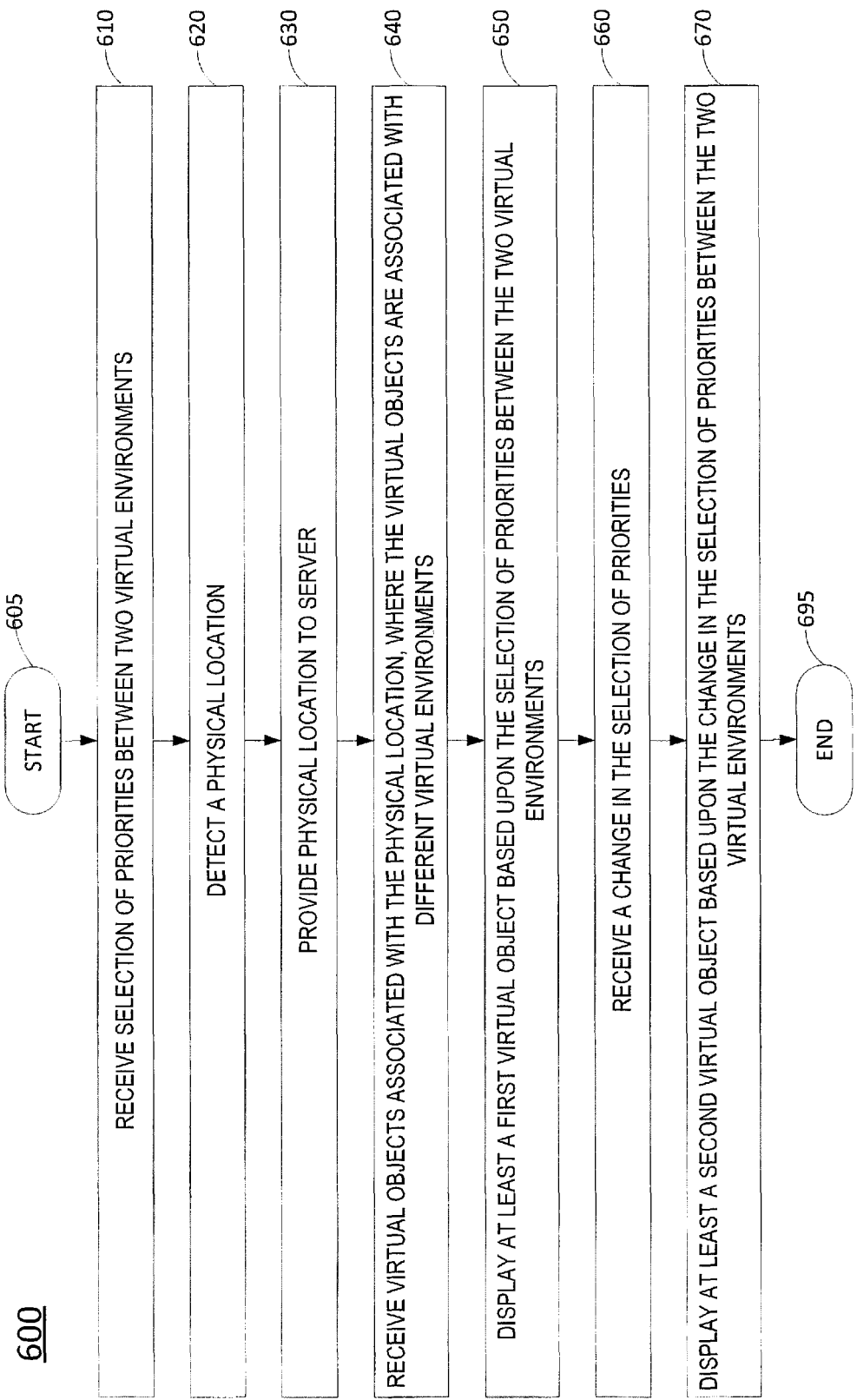
FIG. 6 illustrates an example flowchart of a method for displaying at least one virtual object based upon a selection of priorities between two virtual environments, according to the present disclosure.

To further illustrate examples of the present disclose, FIG. 6 illustrates a flowchart of an example method 600 for displaying at least one virtual object based upon a selection of priorities between two virtual environments. In one example, the steps, operations, or functions of the method 600 may be performed by any one of the AR devices 190-193 of FIG. 1, or by the AR device 320 of FIG. 3. Alternatively, one or more steps, operations, or functions of the method 600 may be implemented by a computing device having a processor, a memory, and input/output devices as illustrated in FIG. 7 and described below, specifically programmed to perform the steps, functions, and/or operations of the method. For illustrative purposes, the method 600 will now be described in terms of an example where operations of the method are performed by a processor of an AR device, broadly a mobile device, or a user device.

The method 600 begins in step 605 and proceeds to step 610. In step 610, the processor receives a selection of priorities between at least two virtual environments. For example, a user of the AR device of the processor may participate in more than one AR environment. In other words, the user may be a member in more than one AR community. Therefore, the user may enter an input for the processor to differentiate from among the different AR environment associated with the user. In one example, the processor may receive the selection via an input comprising a pressing of a key, an entry of a string of text, a voice command, and so forth. To illustrate, a selection of priorities may specify that the user would currently like to see virtual objects from both a family based AR environment and an architecture AR environment, but that the family based AR environment should take precedence in the event of a conflict. For instance, if there is a first virtual object of the family based AR environment and a second virtual object of the architecture AR environment associated with the same physical location, only the first virtual object may be presented. In another example, the second virtual object may be presented in a faded manner or in a translucent manner.

At step 620, the processor detects a physical location of the AR device. For instance, the AR device of the processor may be equipped with a global positioning system (GPS) component, or may be configured to determine location via triangulation or other technique using measured distances between the AR device and one or more access points or base stations. In one example, a near-field communication (NFC) capability can be used to establish the physical proximity of an AR device to a sensor or beacon. In one example, the operations of step 620 may comprise the same or similar operations to those described above in connection with step 430 of the method 400 and steps 520, 540, and 565 of the method 500.

At step 630, the processor provides the physical location that is detected to a server. In one example, the processor may communicate with the server via any type of wired and/or wireless communication between devices over any one or more types of network.

At step 640, the processor receives virtual objects associated with the physical location, where the virtual objects are associated with different virtual environments. For instance, the AR device of the processor may be associated with a user who is a participant in multiple AR environments. In other words, the user is a member of more than one AR community. As such, the processor may receive from the server several virtual objects, where the virtual objects relate to at least two different virtual environments, but where the several virtual objects may be associated with the same physical location.

At step 650, the processor displays at least a first of the virtual objects based upon the selection of priorities between the at least two virtual environments. For example, as mentioned above, the selection of priorities may specify that the user would currently like to see virtual objects from both a family based AR environment and an architecture AR environment, but that the family based AR environment should take precedence in the event of a conflict. For instance, if the processor receives a first virtual object of the family based AR environment and a second virtual of the architecture AR environment associated with the same physical location, only the first virtual object may be presented. In another example, the second virtual object may be presented in a faded manner or in a translucent manner. In still other examples, the second virtual object may be presented in grayscale (without color), without animation (if otherwise animated), and so forth.

In one example, if a first virtual object for a first virtual environment and a second virtual object for the second virtual environment are both received at step 640, the processor may select to display the first virtual object, while also presenting an indicator that at least one other virtual object for another virtual environment exists at the same physical location. Thus, for example, the user may want to only see virtual objects for a single virtual environment at one time, e.g., so that the user is not overwhelmed with too many virtual objects from different virtual environments. However, the user may wish to be made aware of other virtual objects from other virtual environments that may be available so that the user can change priorities and see the other virtual objects. The displaying of at least the first of the virtual objects may take various forms depending upon the type of AR device of the processor. For instance, if the AR device is a smartphone, the displaying may comprise presenting an image, or images, of the at least a first virtual object on a display screen. In another example, if the AR device is an AR headset, the displaying may comprise projecting an image, or images, of the at least a first virtual object within a field of view of the user.

At step 660, the processor receives a change in the selection of priorities. For example, the user may be a professional architect and may want to share the AR device with a client to allow the client to experience the architecture AR environment. Therefore, the user may select to have only virtual objects from the AR virtual environment displayed, e.g., so that no virtual objects from the family-based AR environment will be displayed. In other words, the user may "turn off" and/or "turn on" one or more of the virtual environments as needed or desired.

At step 670, the processor displays at least a second virtual object based upon the change in the selection of priorities between the two virtual environments. In one example, the at least a second virtual object may have been received by the processor at step 640, but was not displayed at step 650 based upon a previous selection of priorities. However, as a result of the change in the selection of priorities, the virtual environment associated with the at least a second virtual object may now take precedence and be displayed. Depending upon the selection of priorities, the processor may continue to display the at least a first virtual object that is displayed at step 640, may cease displaying the at least a first virtual object, or may display the at least a first virtual object in a different form, e.g., faded, translucent, etc.

Following step 670, the method 600 proceeds to step 695 where the method ends.

As such, the present disclosure provides at least one advancement in the technical field of augmented reality devices and networking. This advancement is in addition to the traditional methods of vendor-provided augmented reality shopping applications and the like. In particular, the present disclosure provides for a user to create a virtual object and associate the virtual object with a virtual environment that is selected from among a plurality of different virtual environments associated with the user. The present disclosure further provides for displaying at least one virtual object based upon a selection of priorities between two virtual environments. The present disclosure also provides for the automatic generating of virtual objects at locations in a virtual environment associated with a physical location of an AR device, e.g., where the AR device is the first device to explore a physical location and report imagery of the physical location to a server.

The present disclosure also provides a transformation of data, e.g., device usage data, e.g., of a mobile device/AR device is transformed into instructions which also cause a transformation of data, e.g., the display state of one or more virtual objects. For instance, gestures, voice commands, or other inputs may be received, analyzed, and determined to comprise commands that may cause virtual objects to be created, where none existed before, to become mobile, to be transformed to a different state, e.g., the displayed image of the virtual object may be changed, and so forth. In addition, location data of an AR device is also transformed into selections of virtual objects to be presented to the AR device.

Finally, examples of the present disclosure improve the functioning of computing devices, e.g., servers and mobile devices, including AR devices. Namely, no server or mobile device is presently known to provide for the user-selection of priorities from among different virtual environments/AR environments, where virtual objects from different virtual environments may be presented unaltered, suppressed (i.e., not displayed), or displayed in a different form, such as in faded form, or transparent form, depending upon the selection of the user, and where a user may experience two or more different virtual environments simultaneously via the user's AR device. In addition, no server or mobile device is presently known to provide for user-defined virtual objects to be selectively associated by the user with a virtual environment selected from among a plurality of different virtual environments.

In addition, although not specifically specified, one or more steps, functions or operations of the respective methods 400, 500, and 600 may include a storing, displaying and/or outputting step as required for a particular application. In other words, any data, records, fields, and/or intermediate results discussed in the methods can be stored, displayed and/or outputted either on the device executing the methods 400, 500, or 600, or to another device, as required for a particular application.

Furthermore, steps, blocks, functions or operations in FIGS. 4, 5, and 6 that recite a determining operation or involve a decision do not necessarily require that both branches of the determining operation be practiced. In other words, one of the branches of the determining operation can be deemed as an optional step. Furthermore, steps, blocks, functions or operations of the above described methods can be combined, separated, and/or performed in a different order from that described above, without departing from the examples of the present disclosure. In addition, although FIGS. 4-6 illustrate the respective methods 400, 500, and 600, in one example, any one or more of the methods of FIGS. 4-6 may be combined, or performed in coordinated manner. For instance, the methods 400 and 500 may be performed by the same processor or other device(s), e.g., with the method 400 being performed prior to the steps, functions, and/or operations of the method 500, and so forth.

FIG. 7 depicts a high-level block diagram of a computing device suitable for use in performing the functions described herein. As depicted in FIG. 7, the system 700 comprises one or more hardware processor elements 702 (e.g., a central processing unit (CPU), a microprocessor, or a multi-core processor), a memory 704 (e.g., random access memory (RAM) and/or read only memory (ROM)), a module 705 for associating a virtual object with a location, for associating a virtual object with a location and with a virtual environment that is selected, and/or for displaying at least one virtual object based upon a selection of priorities between two virtual environments, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if any one or more of the methods 400, 500, or 600 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

The one or more hardware processors 702 can also be configured or programmed to cause other devices to perform one or more operations as discussed above. In other words, the one or more hardware processors 702 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one example, instructions and data for the present module or process 705 for associating a virtual object with a location, for associating a virtual object with a location and with a virtual environment that is selected, and/or for displaying at least one virtual object based upon a selection of priorities between two virtual environments (e.g., a software program comprising computer-executable instructions) can be loaded into memory 704 and executed by hardware processor element 702 to implement the steps, functions or operations as discussed above in connection with the illustrative methods 400, 500, and 600. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 705 for associating a virtual object with a location, for associating a virtual object with a location and with a virtual environment that is selected, and/or for displaying at least one virtual object based upon a selection of priorities between two virtual environments (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A non-transitory computer-readable medium storing instructions which, when executed by a processor of a user device, cause the processor to perform operations, the operations comprising:
    receiving a selection of priorities between a first virtual environment associated with a user of the user device and a second virtual environment associated with the user, wherein the selection of priorities comprises a specification of which of the first virtual environment or the second virtual environment is to take precedence when a virtual object of the first virtual environment and a virtual object of the second virtual environment are associated with a same physical location;
    detecting a physical location of the user device;
    providing the physical location to a server;
    receiving virtual objects associated with the physical location from the server, wherein a first virtual object of the virtual objects is only associated with the first virtual environment and wherein a second virtual object of the virtual objects is only associated with the second virtual environment, wherein the first virtual object of the first virtual environment and the second virtual object of the second virtual environment are associated with the physical location; and
    displaying at least the first virtual object based upon the selection of priorities specifying that the first virtual environment is to take precedence.

2. The non-transitory computer-readable medium of claim 1, wherein the selection of priorities specifies that the first virtual object associated with the first virtual environment is to be displayed when the user device is at the physical location and the second virtual object associated with the second virtual environment is not to be displayed when the user device is at the physical location.

3. The non-transitory computer-readable medium of claim 1, wherein the selection of priorities specifies that when the user device is at the physical location, the first virtual object associated with the first virtual environment is to be displayed and the second virtual object associated with the second virtual environment is to be displayed with one of:
    a greater transparency as compared to the first virtual object; or
    a lesser brightness as compared to the first virtual object.

4. The non-transitory computer-readable medium of claim 1, wherein the operations further comprising:
    receiving a change in the selection of priorities; and
    displaying at least the second virtual object based upon the change in the selection of priorities.

5. The non-transitory computer-readable medium of claim 4, wherein the change in the selection of priorities specifies that the second virtual object associated with the second virtual environment is to be displayed when the user device is at the physical location and the first virtual object associated with the first virtual environment is not to be displayed when the user device is at the physical location.

6. The non-transitory computer-readable medium of claim 1, wherein the virtual objects associated with the physical location are received from the server.

7. The non-transitory computer-readable medium of claim 1, wherein the server manages a plurality of virtual environments that includes the first virtual environment and the second virtual environment.

8. A user device comprising:
    a processor; and
    a computer-readable medium storing instruction which, when executed by the processor, cause the processor to perform operations, the operations comprising:
        receiving a selection of priorities between a first virtual environment associated with a user of the user device and a second virtual environment associated with the user, wherein the selection of priorities comprises a specification of which of the first virtual environment or the second virtual environment is to take precedence when a virtual object of the first virtual environment and a virtual object of the second virtual environment are associated with a same physical location;
        detecting a physical location of the user device;
        providing the physical location to a server;
        receiving virtual objects associated with the physical location from the server, wherein a first virtual object of the virtual objects is only associated with the first virtual environment and wherein a second virtual object of the virtual objects is only associated with the second virtual environment, wherein the first virtual object of the first virtual environment and the second virtual object of the second virtual environment are associated with the physical location; and
        displaying at least the first virtual object based upon the selection of priorities specifying that the first virtual environment is to take precedence.

9. The user device of claim 8, wherein the selection of priorities specifies that the first virtual object associated with the first virtual environment is to be displayed when the user device is at the physical location and the second virtual object associated with the second virtual environment is not to be displayed when the user device is at the physical location.

10. The user device of claim 8, wherein the selection of priorities specifies that when the user device is at the physical location, the first virtual object associated with the first virtual environment is to be displayed and the second virtual object associated with the second virtual environment is to be displayed with one of:

a greater transparency as compared to the first virtual object; or a lesser brightness as compared to the first virtual object.

11. The user device of claim 8, wherein the operations further comprising:

receiving a change in the selection of priorities; and displaying at least the second virtual object based upon the change in the selection of priorities.

12. The user device of claim 11, wherein the change in the selection of priorities specifies that the second virtual object associated with the second virtual environment is to be displayed when the user device is at the physical location and the first virtual object associated with the first virtual environment is not to be displayed when the user device is at the physical location.

13. The user device of claim 8, wherein the virtual objects associated with the physical location are received from the server.

14. The user device of claim 8, wherein the server manages a plurality of virtual environments that includes the first virtual environment and the second virtual environment.

15. A method comprising:

receiving, by a processor of a user device, a selection of priorities between a first virtual environment associated with a user of the user device and a second virtual environment associated with the user, wherein the selection of priorities comprises a specification of which of the first virtual environment or the second virtual environment is to take precedence when a virtual object of the first virtual environment and a virtual object of the second virtual environment are associated with a same physical location;

detecting, by the processor, a physical location of the user device;

providing, by the processor, the physical location to a server;

receiving, by the processor, virtual objects associated with the physical location from the server, wherein a first virtual object of the virtual objects is only associated with the first virtual environment and wherein a second virtual object of the virtual objects is only associated with the second virtual environment, wherein the first virtual object of the first virtual environment and the second virtual object of the second virtual environment are associated with the physical location; and displaying, by the processor, at least the first virtual object based upon the selection of priorities specifying that the first virtual environment is to take precedence.

16. The method of claim 15, wherein the selection of priorities specifies that the first virtual object associated with the first virtual environment is to be displayed when the user device is at the physical location and the second virtual object associated with the second virtual environment is not to be displayed when the user device is at the physical location.

17. The method of claim 15, wherein the selection of priorities specifies that when the user device is at the physical location, the first virtual object associated with the first virtual environment is to be displayed and the second virtual object associated with the second virtual environment is to be displayed with one of:

a greater transparency as compared to the first virtual object; or a lesser brightness as compared to the first virtual object.

18. The method of claim 15, further comprising:

receiving a change in the selection of priorities; and displaying at least the second virtual object based upon the change in the selection of priorities.

19. The method of claim 18, wherein the change in the selection of priorities specifies that the second virtual object associated with the second virtual environment is to be displayed when the user device is at the physical location and the first virtual object associated with the first virtual environment is not to be displayed when the user device is at the physical location.

20. The method of claim 15, wherein the virtual objects associated with the physical location are received from the server.

\* \* \* \* \*